Aug. 27, 1935.  G. W. EMRICK  2,012,340
TAPPING ATTACHMENT
Filed May 17, 1934
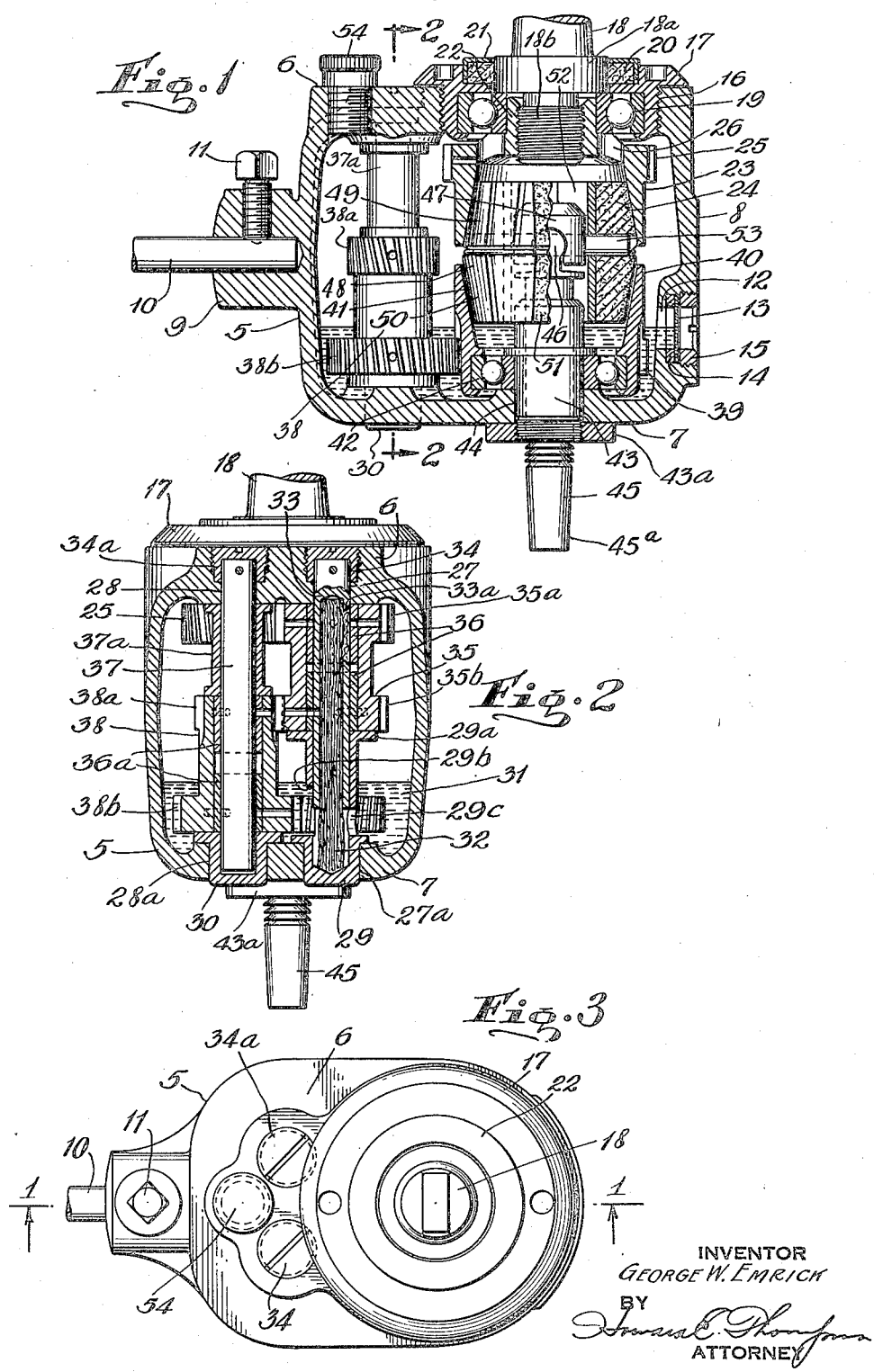
INVENTOR
GEORGE W. EMRICK
BY
Thomas E. Thompson
ATTORNEY Patented Aug. 27, 1935

2,012,340

UNITED STATES PATENT OFFICE 2,012,340

TAPPING ATTACHMENT

George W. Emrick, Brooklyn, N. Y.

Application May 17, 1934, Serial No. 726,107

15 Claims. (Cl. 74—377)

This invention relates to tapping attachments; and the object of the invention is to provide a small compact casing with means for mounting the drive, driven and other shafts and working parts of the attachment within the casing in such manner as to provide a substantially fluid sealed unit to permit the arrangement of lubricating oil in the case to flood the working and engaging parts to provide a high degree of lubricating efficiency in attachments of this class, especially to adapt them for high speeds and heavy loads; a further object being to provide certain parts of the attachment with wicks for feeding the lubricating oil to predetermined surfaces of the working parts to insure proper lubrication thereof; a further object being to provide an attachment of the class described having forward and reverse drive clutch sleeves with a friction clutch member mounted therewithin and with means for universally supporting said friction clutch member upon the driven spindle to provide proper alinement of the clutch member in connection with the spindle and the clutch sleeves; a further object being to provide a casing with one large opening through which the entire clutch drive as well as the gear chains may be inserted in and removed from the case; a still further object being to provide a novel method of mounting the gear shafts or pins in the case and for retaining the mounting means therefor against movement or displacement with respect to the case; a still further object being to provide one side wall of the case adjacent the lower end thereof with a sight glass by means of which the level of oil in the case may be controlled; and with these and other objects in view, the invention consists in a device or attachment of the class and for the purpose specified, which is simple in construction, efficient in use and which is constructed as hereinafter described and claimed.

The invention is fully disclosed in the following specification, of which the accompanying drawing forms a part, in which the separate parts of my improvement are designated by suitable reference characters in each of the views, and in which:

Fig. 1 is a sectional view through an attachment made according to my invention with parts of the construction broken away, the section being on the line 1—1 of Fig. 3.

Fig. 2 is a section on the line 2—2 of Fig. 1; and,

Fig. 3 is a plan view of the device.

In the drawing, 5 represents a case or casing consisting of a top wall 6, bottom wall 7 and side wall 8. The case is relatively small and compact in size, the side wall having at one side an extension 9 in which a stop rod 10 is mounted and secured by a screw 11 to hold the case against rotation when in use. The side wall 8 of the case is also provided with a sight opening 12 adjacent the lower end thereof, in which is mounted a glass or transparent panel 13 resting upon a cork or other packing ring 14 and a sleeve nut 15 is employed to retain the panel 13 in position.

The top wall 6 of the case has a large threaded opening 16 which gives access to the interior of the case, permitting the insertion and removal of the several parts of the complete attachment. A case cover 17 is in threaded engagement with the opening 16. Supported therein is a tapered shank or spindle 18, which rotates freely in a ball bearing 19 supported in the cover 17 as clearly seen in Fig. 1 of the drawing. The enlarged collar portion 18a of the shank 18 is enclosed in a felt or other packing 20 held in place by a cover 21. This packing prevents the leakage of oil around the shank, as will be apparent.

The inner end of the shank 18 is reduced and threaded as seen at 18b to engage the upper end 22 of a clutch driving shell or sleeve 23. This sleeve has a tapered bore 24 and a gear face 25. A plurality of ports 26 extend from the bore 24 out through the top of the sleeve 23 to aid in transferring lubricant to the ball bearing 16, as will be seen upon a consideration of Fig. 1 of the drawing.

At one side of the case, the top and bottom walls 6 and 7 thereof are provided with bores 27, 27a, 28, 28a which are arranged in common vertical alinement. In the bores 27a, 28a are secured thrust bearings 29, 30 respectively for the gear chain employed.

The bearing 29 extends upwardly into the case and has a flared end 29a. The lower portion of the bearing is cut out as seen at 29b to form a clearance for one of the gears employed and is apertured as seen at 29c to permit the free passage of the lubricating oil indicated at 31 into the bearing 29 to engage a wick 32 supported in a tubular shaft 33 and extending into the lower end of the bearing 29.

The shaft 33 is keyed to a cap or plug 34 in threaded engagement with the bore 27 by means of which said shaft may be attached and detached with respect to the case, as will be apparent. Rotatably mounted on the shaft 33 is a reverse quill gear 35 having gear faces 35a and 35b, the first meshing with the gear face 25 on the sleeve 23. Within the gear 35 are bushings 36 through which and the gear faces 35a, 35b are oil passages by means of which oil may be fed from the wick 32 to the teeth of said gears, as will be apparent.

It will be understood at this time that a certain amount of splash will prevail in the chamber of the casing, which will also splash oil to the surfaces of the gears and the other working parts which may also be contributed to the churning action which will prevail. The shaft 33 is apertured at its upper end as indicated at 33a to expose the wick 32 to the upper bushing as well as to the gear 35a for supplying the lubricant thereto.

The shaft 37 has its lower end supported in the thrust bearing 30 and the upper end is keyed to a cap or plug 34a similar to the plug 34 and by means of which the shaft 37 may be inserted and removed from the case. The cover 17 or the projecting flange thereof overlies the plugs 34 and 34a, note Fig. 3 of the drawing, thus retaining said plugs against displacement from the case.

On the shaft 37 are bearings 36a similar to the bearings 36, upon which an idler quill gear 38 is mounted, said gear having gear surfaces 38a and 38b. The surface 38a meshes with the gear surface 35b, whereas the surface 38b meshes with a gear surface 39 on a reverse clutch drive sleeve or shell 40. A spacing collar 37a is disposed on the shaft 37 between the quill gear 38 and the top wall 6 of the case as clearly seen in Fig. 2 of the drawing. Oil holes are provided through the gear surfaces 38a and 38b to the bearings 36a and the shaft 37.

The bore of the sleeve 40 has a beveled friction surface 41. In this sleeve is a ball bearing 42 supported on a spindle bushing 43 secured in an aperture 44 formed in the bottom wall 7 of the case in axial alinement with the aperture 16. The bushing 43 is held in place by a nut 43a which engages the botom wall of the case. This bushing, in conjunction with the bottom wall of the case, forms an oil reservoir, the level of which is maintained below the top of the bushing 43 by provision of the sight opening or gage 12.

In the bushing 43 is mounted a chuck spindle 45 to the projecting end of which may be attached a chuck of any kind or class suitable for attachment to taps and other tools. On the inner end of the spindle 45 is a head 46 on which is mounted a universal joint cap 47 for universally supporting a dual friction clutch head 48 in connection with the spindle. This clutch head forms the subject matter of companion applications filed by me May 5, 1934, and bearing Serial Numbers 724,109 and 724,110. The head 48 has a conical friction surface 49 disposed within and adapted to engage the tapered bore 24 of the sleeve 23 and a conical friction surface 50 for engaging the tapered bore 41 of the sleeve 40.

As defined in said companion applications, the head 48 is composed of a split ring of asbestos or other fibrous material treated with a thermo setting substance, such for example, as bakelite, the surface of the material being treated to provide a friction surface on the conical surfaces 49, 50. A felt strip 51 is disposed in the split of the head 48 to permit expansion and contraction of the head in the gripping engagement thereof with the clutch sleeves 23 and 40, as well as to provide a wick for feeding the lubricant to the surfaces 49 and 50, both of which are grooves as indicated at the left of Fig. 1 of the drawing.

Within the head 48 is a split spring sleeve 52 which supports said head and serves to tensionally maintain the same in engagement with the clutch sleeves 23 and 40, while at the same time, providing the desired slippage between the engaged surfaces. The universal coupling of the spindle with the head includes a pin 53 which transverses the head and the universal cap or block 47.

In the top wall 6 of the case is an oil filling plug 54 by means of which oil may be placed in the case, and the oil is preferably maintained at a level centrally of the window panel in the sight opening 12.

The operation of the attachment will be readily understood from the foregoing description when taken in connection with the accompanying drawing and the following statement. The shank 18 constitutes the drive member, the same being coupled with the machine for actuating the tapper in the usual manner. The rotation of the member 18 correspondingly rotates the sleeve 23, and the spindle 45 is driven directly through the head 48 by frictional engagement of the conical surface 49 thereof with the tapered bore 24 of said sleeve.

In connection with the drive of the spindle, it will be apparent that by virtue of the ball bearing mountings employed and the slight play or clearance which is provided in the bearings, the complete case is capable of slight movement with respect to either of the sleeves 23, 40 when in driving engagement with the head 48 which in conjunction with the universal coupling of the head with the spindle 45 insures proper alinement and centering of the working parts one with respect to the other.

In the direct drive, it will be understood that the quill gear 35 as well as the quill gear 38 are rotated, and the sleeve 40 is rotating freely in the case out of engagement with the head 48, whereas in the reverse drive or in withdrawing a tap from a workpiece, the surface 50 of the head 48 will be brought into frictional engagement with the sleeve 40. The sleeve 40, which is driven in the reverse direction through the gear train 35, 38 will withdraw the tap from the workpiece.

In either of the driving operations of the attachment, a slight slippage is provided between the conical surfaces of the head 48 and over respective clutch sleeves 23 and 40, which slippage will increase if the load or strain on the tool is increased beyond a strain which is fixed or substantially fixed by the manufacturer in the construction of the attachment. Should the tap be stopped at any time by reason of excessive strain, the clutch sleeve in the driving engagement will frictionally pass over the head without strain or breakage to any part of the complete attachment.

Another feature of my invention resides in the fact that the casing design facilitates the secure mounting of the chuck upon the tapered portion 45a of the spindle by engaging the inner end of the spindle through the opening 16 in the casing when the cap 17 including the sleeve 23 is removed, the pressure upon the spindle 45 being applied to the member 47.

By virtue of the heat treated friction surfaces 49 and 50 employed on the clutch head 48, no destruction to the head or such surfaces will be experienced. By providing the means of lubrication herein shown and described, the various working parts of the attachment will be maintained thoroughly lubricated at all times to reduce wear on the engaging surfaces, thus producing long life to the attachment and permitting the attachment to be operated at high speed without danger of excessive wear on the various parts thereof.

While I have defined the case as having top, bottom and side walls, it will be understood that this is purely for descriptive purposes, as in use, the wall arrangement may be varied as to the definition herein given, and it will also be understood that my invention is not necessarily limited to the use of the device or attachment herein shown and described, nor to the specific structures of the several elements employed, and various other changes in and modifications of the structure herein disclosed may be made within the scope of the appended claims without departing from the spirit of my invention or sacrificing its advantages.

Having fully described my invention, what I claim as new and desire to secure by Letters Patent, is:

1. In a device of the class described comprising a case having top, bottom and side walls, the top wall having a relatively large opening arranged at one side of the case, the other side of the case having vertically arranged shafts in the top and bottom walls, a forward and reverse drive unit consisting of forward and reverse drive clutch sleeves with a clutch head disposed between said sleeves and movable into engagement therewith, each sleeve having a peripheral gear surface, a gear train for placing said clutch sleeves in operative engagement with each other, said gear train comprising a quill-gear mounted on each of said shafts, the quill-gear of one shaft being in operative engagement with the quill-gear of the other shaft, the quill-gear on one shaft engaging the gear surface of one sleeve, the quill-gear of the other shaft engaging the gear surface of the other sleeve to provide the drive for said reverse clutch sleeve, a drive shaft in operative engagement with the forward driven clutch sleeve, bushings on said first named shafts for spacing the quill-gear thereon within said case, a closure cap for the opening of said case, a ball bearing in said cap in which the drive shaft and said forward drive clutch sleeve is mounted, and the dimensions of said sleeves and head being such as to be insertable and removable into the case through the opening in the top wall thereof without disturbing the quill-gears on said first named shafts.

2. In a device of the class described comprising a case having top, bottom and side walls, the top wall having a relatively large opening arranged at one side of the case, the other side of the case having vertically arranged shafts in the top and bottom walls, a forward and reverse drive unit consisting of forward and reverse drive clutch sleeves with a clutch head disposed between said sleeves and movable into engagement therewith, each sleeve having a peripheral gear surface, a gear train for placing said clutch sleeves in operative engagement with each other, said gear train comprising a quill-gear mounted on each of said shafts, the quill-gear of one shaft being in operative engagement with the quill-gear of the other shaft, the quill-gear on one shaft engaging the gear surface of one sleeve, the quill-gear of the other shaft engaging the gear surface of the other sleeve to provide the drive for said reverse clutch sleeve, a drive shaft in operative engagement with the forward driven clutch sleeve, bushings on said first named shafts for spacing the quill-gear thereon within said case, a closure cap for the opening of said case, a ball bearing in said cap in which the drive shaft and said forward drive clutch sleeve is mounted, the dimensions of said sleeves and head being such as to be insertable and removable into the case through the opening into the top wall thereof without disturbing the quill-gears on said first named shafts, said first named shafts being removable through the top wall of the case, and said cover having an extending flange normally retaining the shafts against displacement from the case.

3. A device of the class described comprising a case having top, bottom and side walls, the top wall having a relatively large opening arranged at one side of the case, a cover closing said opening, a forward and reverse driving clutch unit arranged in said case consisting of two clutch sleeves and a clutch head disposed within and between said sleeves, a gear train placing the sleeves of said unit in operative engagement, one clutch sleeve having a spindle extending through said cover, and said clutch head having a spindle extending through the bottom wall of the case in substantial alinement with the first named spindle, and the outside dimensions of the several parts of the clutch unit independent of the gear train being less than the diameter of the opening in said top wall to facilitate the attachment and detachment of the unit through said opening upon the removal of said cover.

4. A device of the class described comprising a case having top, bottom and side walls, the top wall having a relatively large opening arranged at one side of the case, a cover closing said opening, a forward and reverse driving clutch unit arranged in said case consisting of two clutch sleeves and a clutch head disposed within and between said sleeves, a gear train placing the sleeves of said unit in operative engagement, one clutch sleeve having a spindle extending through the bottom wall of the case in substantial alinement with the first named spindle, the outside dimensions of the several parts of the clutch unit independent of the gear train being less than the diameter of the opening in said top wall to facilitate the attachment and detachment of the unit through said opening upon the removal of said cover, said gear train comprising a pair of shafts mounted in the top and bottom walls of the case at one side of said opening, sleeves rotatably mounted on said shafts, each sleeve having spaced gears meshing with the gear surfaces on adjacent clutch sleeves and the other gears of said sleeves intermeshing to complete the drive from one driven clutch sleeve to the other.

5. A device of the class described comprising a case having top, bottom and side walls, the top wall having a relatively large opening arranged at one side of the case, a cover closing said opening, a forward and reverse driving clutch unit arranged in said case consisting of two clutch sleeves and a clutch head disposed within and between said sleeves, a gear train placing the sleeves of said unit in operative engagement, one clutch sleeve having a spindle extending through the bottom wall of the case in substantial alinement with the first named spindle, the outside dimensions of the several parts of the clutch unit independent of the gear train being less than the diameter of the opening in said top wall to facilitate the attachment and detachment of the unit through said opening upon the removal of said cover, said gear train comprising a pair of shafts mounted in the top and bottom walls of the case at one side of said opening, sleeves rotatably mounted on said shafts, each sleeve having spaced gears meshing with the gear surfaces on adjacent clutch sleeves, the other gears of said sleeves intermeshing to complete the drive from one driven clutch sleeve to the other, bushings in the bottom wall of the case forming bearings for said shafts, threaded plugs coupled with the upper ends of said shafts for coupling the shafts with the case, and said plugs being disposed beneath the cover of the case and retained against displacement thereby.

6. In a device of the class described comprising a case having top, bottom and side walls, the top wall having a relatively large opening arranged at one side of the case, the other side of the case having vertically arranged shafts mounted in said top and bottom walls. a forward and reverse drive clutch unit consisting of forward and reverse drive clutch sleeves entering conical friction surfaces with a clutch head disposed between said sleeves and movable into engagement with said conical friction surfaces, each sleeve having a peripheral gear surface, a gear train for placing clutch sleeves of said unit in operative engagement with each other, said gear train comprising a quill gear mounted on each of said shafts, the quill gear of one shaft being in operative engagement with the quill gear of the other shaft centrally of said shafts, the quill gear of one shaft engaging the gear surface of one sleeve, the quill gear of the other shaft engaging the gear surface of the other sleeve to provide the drive for said reverse clutch sleeve, and a drive shaft in operative engagement with the forward driven clutch sleeve.

7. A tapping attachment of the class described comprising a case having a relatively large chamber therein, a clutch unit in said chamber and including a forward drive clutch sleeve, a reverse drive clutch sleeve and a clutch head within said sleeves and adapted to engage one or the other thereof, a gear train in the chamber of said case for placing the forward and reverse drive clutch sleeves in operative engagement, an elongated non-rotatable sleeve secured and sealed in the lower wall of the case and extending well into the chamber thereof, a driven shaft mounted in said sleeve with which the clutch head is freely coupled, and the extension of the sleeve into the chamber of the case forming in conjunction with the case a relatively deep reservoir in the lower end thereof in which lubricating oil may be maintained at a level below the innermost end of the sleeve to substantially seal the oil within said reservoir.

8. A tapping attachment of the class described comprising a case having a relatively large chamber therein, a clutch unit in said chamber and including a forward drive clutch sleeve, a reverse drive clutch sleeve and a clutch head within said sleeves and adapted to engage one or the other thereof, a gear train in the chamber of said case for placing the forward and reverse drive clutch sleeves in operative engagement, an elongated non-rotatable sleeve secured and sealed in the lower wall of the case and extending well into the chamber thereof, a driven shaft mounted in said sleeve with which the clutch head is freely coupled, the extension of the sleeve into the chamber of the case forming in conjunction with the case a relatively deep reservoir in the lower end thereof in which lubricating oil may be maintained at a level below the innermost end of the sleeve to substantially seal the oil within said reservoir, and one of said clutch sleeves and part of the gear train extending into and operating in said oil reservoir.

9. A tapping attachment of the class described comprising a case having a relatively large chamber therein, a clutch unit in said chamber and including a forward drive clutch sleeve, a reverse drive clutch sleeve and a clutch head within said sleeves and adapted to engage one or the other thereof, a gear train in the chamber of said case for placing the forward and reverse drive clutch sleeves in operative engagement, an elongated non-rotatable sleeve secured and sealed in the lower wall of the case and extending well into the chamber thereof, a driven shaft mounted in said sleeve with which the clutch head is freely coupled, the extension of the sleeve into the chamber of the case forming in conjunction with the case a relatively deep reservoir in the lower end thereof, in which lubricating oil may be maintained at a level below the innermost end of the sleeve to substantially seal the oil within said reservoir, and means comprising a ball bearing in the reverse drive clutch sleeve for rotatably mounting said clutch sleeve upon said non-rotatable sleeve.

10. A tapping attachment of the class described comprising a case having a relatively large chamber therein, a clutch unit in said chamber and including a forward drive clutch sleeve, a reverse drive clutch sleeve and a clutch head within said sleeves and adapted to engage one or the other thereof, a gear train in the chamber of said case for placing the forward and reverse drive clutch sleeves in operative engagement, an elongated non-rotatable sleeve secured and sealed in the lower wall of the case and extending well into the chamber thereof, a driven shaft mounted in said sleeve with which the clutch head is freely coupled, the extension of the sleeve into the chamber of the case forming in conjunction with the case a relatively deep reservoir in the lower end thereof in which lubricating oil may be maintained at a level below the innermost end of the sleeve to substantially seal the oil within said reservoir, one of said clutch sleeves and part of the gear train extending into and operating in said oil reservoir, the side wall of the case adjacent the bottom thereof having an opening, and means countersunk in said opening for securing a transparent panel therein to form a gage disposed below the innermost end of the non-rotatable sleeve.

11. A tapping attachment of the class described comprising a case having a relatively large chamber therein, a clutch unit in said chamber and including a forward drive clutch sleeve, a reverse drive clutch sleeve and a clutch head within said sleeves and adapted to engage one or the other thereof, a gear train in the chamber of said case for placing the forward and reverse drive clutch sleeves in operative engagement, an elongated non-rotatable sleeve secured and sealed in the lower wall of the case and extending well into the chamber thereof, a driven shaft mounted in said sleeve with which the clutch head is freely coupled, the extension of the sleeve into the chamber of the case forming in conjunction with the case a relatively deep reservoir in the lower end thereof in which lubricating oil may be maintained at a level below the innermost end of the sleeve to substantially seal the oil within said reservoir, one of said clutch sleeves and part of the gear train extending into and operating in said oil reservoir, said gear train comprising two quill gears mounted on independent shafts arranged in the case, and means for extending the lubricating oil from said reservoir upwardly through the shafts of said quill gears.

12. In a tapping attachment, a case consisting of top, bottom and side walls forming a relatively large chamber therein, the drive mechanism of the attachment being arranged in said chamber, the top wall at one side of the case having a large opening, the bottom wall of the case having a smaller opening in axial alinement with the first named opening, an elongated non-rotatable bearing sleeve fixedly secured and sealed in the opening in said bottom wall and extending upwardly into the chamber of the case to a point adjacent the central portion of said chamber, said bearing sleeve forming in conjunction with the walls of the case at the bottom thereof a relatively deep reservoir for lubricating oil, a transparent panel imbedded in the side wall of the case adjacent the lower portion thereof to maintain a level of oil in said reservoir below the upper end of the bearing sleeve or adjacent said end whereby the lubricating oil contained in said reservoir is sealed from displacement from the case between said sleeve and the opening in the case in which the sleeve is mounted.

13. In a tapping attachment, a case consisting of top, bottom and side walls forming a relatively large chamber therein, the drive mechanism of the attachment being arranged in said chamber, the top wall at one side of the case having a large opening, the bottom wall of the case having a smaller opening in axial alinement with the first named opening, an elongated non-rotatable bearing sleeve fixedly secured and sealed in the opening in said bottom wall and extending upwardly into the chamber of the case to a point adjacent the central portion of said chamber, said bearing sleeve forming in conjunction with the walls of the case at the bottom thereof a relatively deep reservoir for lubricating oil, a transparent panel imbedded in the side wall of the case adjacent the lower portion thereof to maintain a level of oil in said reservoir below the upper end of the bearing sleeve or adjacent said end whereby the lubricating oil contained in said reservoir is sealed from displacement from the case between said sleeve and the opening in the case in which the sleeve is mounted, and the top and bottom walls of the case being provided with pairs of apertures arranged in axial alinement with each other, cup-shaped bushings secured in the pair of apertures in the bottom wall of the case, plugs in threaded engagement with the pair of apertures in the top wall of the case, and shafts on said plugs, the lower ends of which are mounted in said cup-shaped bushings.

14. In a tapping attachment, a case consisting of top, bottom and side walls forming a relatively large chamber therein, the drive mechanism of the attachment being arranged in said chamber, the top wall at one side of the case having a large opening, the bottom wall of the case having a smaller opening in axial alinement with the first named opening, an elongated non-rotatable bearing sleeve fixedly secured and sealed in the opening in said bottom wall and extending upwardly into the chamber of the case to a point adjacent the central portion of said chamber, said bearing sleeve forming in conjunction with the walls of the case at the bottom thereof a relatively deep reservoir for lubricating oil, a transparent panel imbedded in the side wall of the case adjacent the lower portion thereof to maintain a level of oil in said reservoir below the upper end of the bearing sleeve or adjacent said end whereby the lubricating oil contained in said reservoir is sealed from displacement from the case between said sleeve and the opening in the case in which the sleeve is mounted, the top and bottom walls of the case being provided with pairs of apertures arranged in axial alinement with each other, cup-shaped bushings secured in the pair of apertures in the bottom wall of the case, plugs in threaded engagement with the pair of apertures in the top wall of the case and shafts on said plugs, the lower ends of which are mounted in said cup-shaped bushings, and a cap in threaded engagement with the first named opening in the top wall of the case, said cap including an outwardly extending flange seating on the top wall of the case and overlying said threaded plugs to retain said plugs against displacement.

15. A tapping attachment comprising a case consisting of top, bottom and side walls with a chamber formed therein, a drive shaft rotatably mounted in the top wall of the case, a forward drive clutch coupled with said shaft, an elongated bearing sleeve secured and sealed in the bottom wall of the case in axial alinement with the drive shaft and extending well into the case, a driven shaft rotatably mounted in said sleeve, means including a ball bearing for rotatably mounting a reverse drive clutch upon the inner end of the sleeve within the chamber of the case, a gear train within the chamber of the case at one side of said forward and reverse drive clutches and placing the same in operative engagement with each other, and a clutch head freely coupled with the inner end of the driven shaft and adapted to engage one or the other of said clutches.

GEORGE W. EMRICK.